United States Patent [19]
Morgan

[11] Patent Number: 5,425,561
[45] Date of Patent: Jun. 20, 1995

[54] FLEXIBLE INSERT FOR AN AUTOMOTIVE BUMPER

[75] Inventor: Terry B. Morgan, Lansing, Mich.

[73] Assignee: General Motors Corporation, Detroit, Mich.

[21] Appl. No.: 170,964

[22] Filed: Dec. 21, 1993

[51] Int. Cl.6 .............................................. B60R 19/24
[52] U.S. Cl. .................................. 293/120; 293/122; 293/154
[58] Field of Search ................................ 293/120–122, 293/154, 155; 24/530, 545, 563

[56] References Cited

U.S. PATENT DOCUMENTS

| | | |
|---|---|---|
| 2,275,127 | 3/1942 | Brown ............................ 293/155 X |
| 3,897,095 | 7/1975 | Glance et al. . |
| 3,901,543 | 8/1975 | Norlin . |
| 3,930,665 | 1/1976 | Ikawa . |
| 3,938,841 | 2/1976 | Glance et al. . |
| 3,995,901 | 12/1976 | Filbert, Jr. et al. . |
| 3,997,207 | 12/1976 | Norlin . |
| 4,018,466 | 4/1977 | Norlin . |
| 4,193,621 | 3/1980 | Peichl et al. ..................... 293/155 X |
| 4,652,032 | 3/1987 | Smith .................................. 293/120 |
| 4,875,728 | 10/1989 | Copp et al. ...................... 293/154 X |
| 4,940,270 | 7/1990 | Yamazaki et al. ................. 293/122 |
| 5,114,198 | 5/1992 | Yamashita et al. . |
| 5,219,197 | 6/1993 | Rich et al. . |

*Primary Examiner*—Dean J. Kramer
*Attorney, Agent, or Firm*—Saul Schwartz

[57] ABSTRACT

A motor vehicle bumper system including a closed cross section impact beam having at least one open end and a reinforcing insert in the open end. The reinforcing insert has a central flat wall and a pair of flat, flexible wings attached to the central wall which cooperate with the latter in achieving energy absorbing performance similar to the more complex impact beam inserts having molded, egg crate-type constructions. The flat flexible wings and the central flat wall afford simple press-in installation and frictional retention in the open end of the impact beam.

5 Claims, 2 Drawing Sheets

FLEXIBLE INSERT FOR AN AUTOMOTIVE BUMPER

BACKGROUND OF THE INVENTION

1. FIELD OF THE INVENTION

The present invention relates generally to automotive bumpers, and in particular is concerned with a flexible, reinforcing insert for a closed cross section impact beam.

2. DESCRIPTION OF THE RELATED ART

Soft bumper systems for both front and rear ends of automobiles are well-known. Generally, an impact beam (also known as an impact bar) is mounted to a frame or support structure with fasteners or other suitable means. Impact beams are designed to resist deformation during impact, and reduce damage to the body and other components. Oftentimes, an energy-absorbing material is mounted on the outer face of an impact beam to absorb energy imparted by a collision. A pliable fascia is fitted over the energy-absorbing medium to provide an attractive outer surface of the bumper system.

Various profiles and cross sections are used for impact beams. Some cross sections are open, while others are closed. Closed cross section beams can be formed with thin walls of roll-formed metal to produce lightweight and effective impact beams.

U.S. Pat. No. 5,219,197, issued Jun. 15, 1993 and assigned to the present assignee, discloses a reinforcing insert for an automotive bumper. The insert is formed as a plurality of interconnected molded cells and is received in an open end of a closed cross section impact beam. The insert includes means to prevent overtravel when the insert is slid into the open end of the beam.

SUMMARY OF THE INVENTION

The present invention includes a reinforced automotive bumper assembly. A reinforcing insert is received at an open end of a closed impact beam to provide increased resistance to deformation during a collision. The insert is easily compressed to permit installation, and then springs apart to be retained inside the impact beam by a press fit, thereby eliminating the need for separate fasteners. The resistance force provided by the insert can be varied by changing the gage of material used to form the insert.

In a preferred embodiment, an automotive bumper includes a bumper beam having a closed cross section and at least one open end. A reinforcing insert, inserted into the open end, has first and second flexible portions springably compressed to provide a press fit.

DETAILED DESCRIPTION OF THE PREFERRED EMBODIMENT

Figure 1:
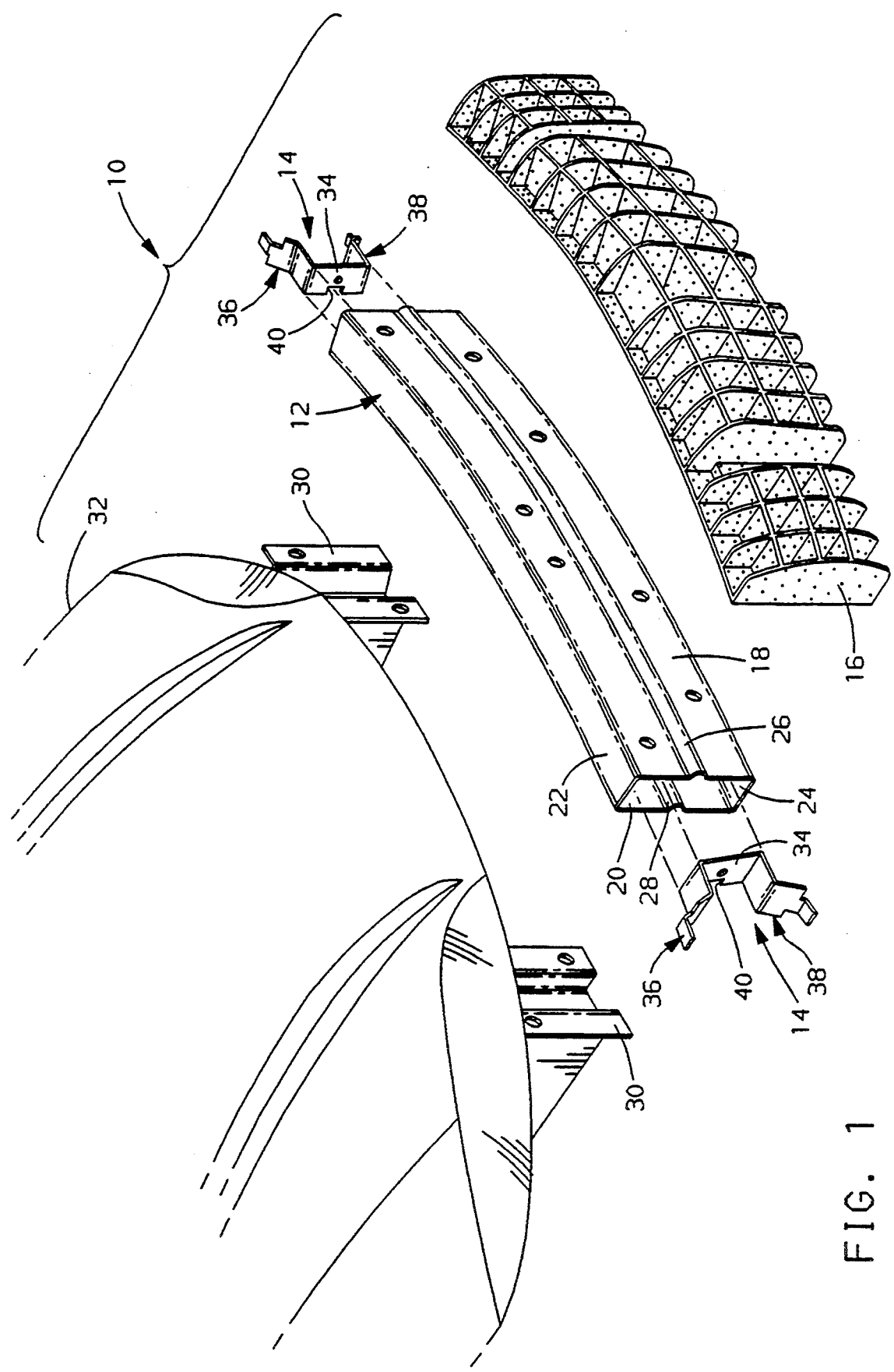
FIG. 1 is an exploded perspective view of an automotive bumper system illustrating a reinforcing insert according to the present invention at each open end of a closed cross section impact beam.

An automotive bumper system is indicated generally at 10 in FIG. 1. The system 10 includes a tubular impact beam 12, reinforcing inserts 14, and preferably an energy absorber 16. A fascia (not illustrated) can be fitted over the energy absorber 16 in a well-known manner.

The impact beam 12 has a closed cross section bounded by an outer impact wall 18 and an inner support wall 20 connected by a top wall 22 and a bottom wall 24. Preferably, the impact beam 12 is formed by roll forming thin metal and includes an outwardly projecting strengthening rib 26 provided at a central portion of the impact wall 18 parallel to the longitudinal axis of the impact beam 12. A similar strengthening rib 28 can be provided in the support wall 20. The impact beam 12 is attached to a vehicle in any suitable manner, including fasteners (not illustrated) received by brackets 30 mounted on a frame. While the bumper system 10 in FIG. 1 is shown at the front of a vehicle 32, it is appreciated that such a system can be adapted for the rear of the vehicle 32.

The energy absorber 16 is illustrated as an elastic deformable element consisting of a plurality of interconnected molded cells. In other embodiments, the energy absorber 16 can be formed from foam or other suitable materials. As stated above, a fascia (not illustrated) is fitted over the energy absorber 16.

Each insert 14 is a flexible member having a central wall 34 joining an upper wing 36 and a lower wing 38. A cutout 40 can be provided in the wall 34 to accommodate rib 28 of the support wall 20. The upper wing 36 has a first section 42 integral with the wall 34 and formed at an approximate right angle with the wall 34. The first section 42 has a width W1 (illustrated best in FIGS. 3 and 4) less than a distance W3 between the impact and support walls 18, 20 of the impact beam 12. The first section 42 can include a bend as indicated at 44. A second section 46 is preferably formed at the terminal end of the first section 42 and has a width W2 less than W1. In a similar manner, the lower wing 38 has a first section 48, a bend 50 and a second section 52. The first section 48 has a width W4 less than the distance W3 and the second section 52 has a width W5 less than W4.

Figure 2:
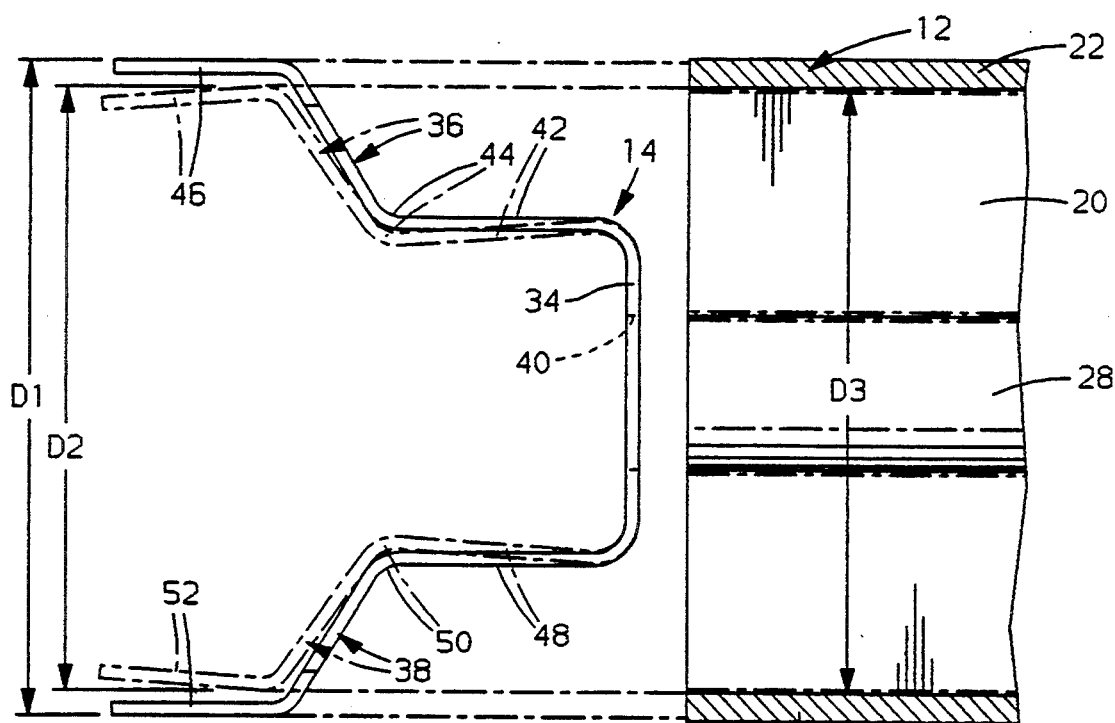
FIG. 2 is an enlarged side view of one of the inserts of FIG. 1 shown in the non-compressed state prior to insertion into an open end of the impact beam, while phantom lines illustrate the compression required to fit the insert into the beam.

As illustrated in FIG. 2, each insert 14 is formed so that a distance D1 exists between the outer surfaces of the second sections 46, 52 when the insert 14 is in the relaxed (non-compressed) state prior to insertion. When installed, the upper and lower wings 36, 38 are compressed (illustrated by phantom lines in FIG. 2) so that a distance D2 between the outer surfaces of the second sections 46, 52 substantially equals or is less than distance D3 between the inner surfaces of the top and bottom walls 22, 24 of the impact beam 12. In this manner, the insert 14 can be slid into an open end of the impact beam 12 and then released so that a press fit exists as the wings 36, 38 spring apart against the top and bottom walls 22, 24. If desired, spot welds can be provided between the second section 46 and the top wall 22 and between the second section 52 and the bottom wall 24.

Figure 3:
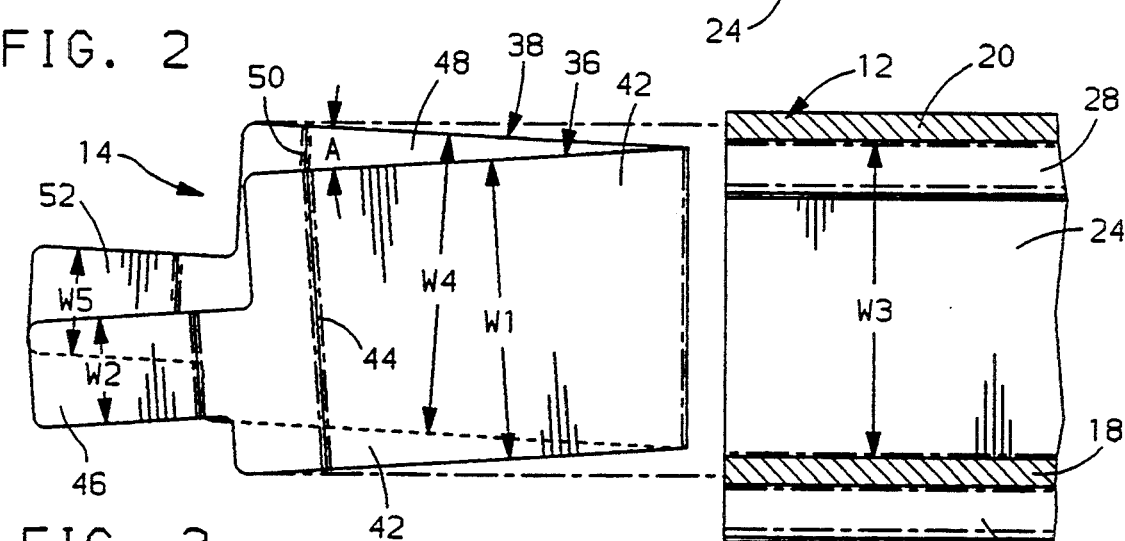
FIG. 3 is a top view of the insert and impact beam of FIG. 2 prior to insertion illustrating the angular offset of an upper wing with respect to a lower wing.

Preferably, each insert 14 is formed so that the wings 36, 38 have an angular displacement or offset with respect to each other when viewed from above, as illustrated in FIG. 3, in the relaxed state prior to installation.

Figure 4:
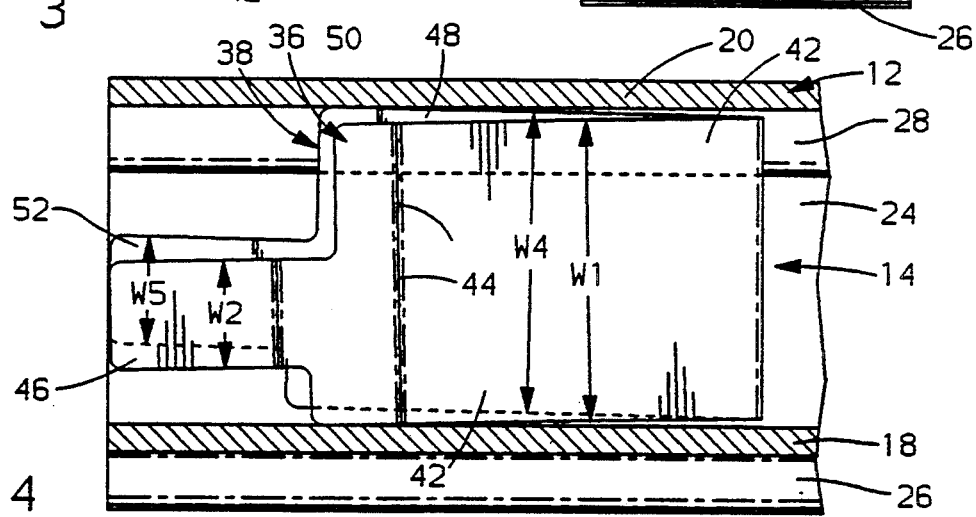
FIG. 4 is a view similar to FIG. 3 after the insert has been inserted and seated inside the impact beam.

Preferably, an angle A is formed between the same side leading edges of the upper wing 36 and the lower wing 38. For installation, the wings 36, 38 are urged toward one another in the fore-aft direction to reduce angle A while simultaneously being compressed as described above to reduce D1. Once inserted into the open end of the impact beam 12, the wings 36, 38 spring apart so that the first section 42 of the upper wing 36 rests against the impact wall 18 and the first section 48 of the lower wing 38 rests against the support wall 20 as illustrated in FIG. 4 (or vice versa if the insert 14 in inverted). Simultaneously, the second section 46 of the upper wing 36 rests against the top wall 22 and the second section 52 of the lower wing 38 rests against the bottom wall 24 (or vice versa if the insert 14 is inverted).

When installed, the insert 14 is held in place by the press fit against the inner surfaces of the walls 18, 20, 22, 24 of the impact beam 12. The insert 14 provides retention in both the fore-aft direction and the top-bottom direction of the impact beam 12.

During a collision, the inserts 14 enhance the resistance of the impact beam 12 to collision forces. In a preferred embodiment, the inserts 14 are formed from a high strength steel to provide adequate memory so that the press fits will be retained over the life of the vehicle 32. The resistance force provided by the inserts can be easily varied by changing the gage of the steel.

Although the present invention has been described with reference to a preferred embodiment, persons skilled in the art will recognize that changes may be made in form and detail without departing from the spirit and scope of the invention.

The embodiments of the invention in which an exclusive property or privilege is claimed are defined as follows:

1. An automotive bumper system comprising:
   (a) an impact beam having a closed cross section in a plane perpendicular to a longitudinal centerline of the impact beam bounded by an outer wall, an inner wall, a top wall, and a bottom wall and including at least one open end; and
   (b) a reinforcing insert, inserted into the open end of the impact beam parallel to the longitudinal centerline thereof, having a central flat wall and a first flexible flat wing and a second flexible flat wing each attached to the central flat wall and springably compressed toward each other to provide a press fit against respective ones of the top wall and the bottom wall.

2. The automotive bumper system as specified in claim 1 wherein:
   the first flexible flat winq has a same side leading edge angularly displaced from a same side leading edge of the second flexible flat wing so that when the reinforcing insert is inserted into the open end of the impact beam the first flexible flat wing presses against one of the outer or inner walls and
   the second flexible flat wing presses against the other of the outer or inner walls.

3. The automotive bumper system as specified in claim 2 wherein each of the first and the second flexible flat wings and the central flat wall of the insert are integrally formed.

4. The automotive bumper system as specified in claim 3 wherein each of the first and the second flexible flat wings and the central flat wall of the insert are integrally formed from sheet metal.

5. The automotive bumper system as specified in claim 4 including energy absorber means mounted on the impact beam.

* * * * *